US011901815B2

(12) United States Patent
Li et al.

(10) Patent No.: US 11,901,815 B2
(45) Date of Patent: Feb. 13, 2024

(54) VOLTAGE COMPENSATION METHOD AND DEVICE OF VOLTAGE REDUCING CIRCUIT

(71) Applicant: INSPUR SUZHOU INTELLIGENT TECHNOLOGY CO., LTD., Jiangsu (CN)

(72) Inventors: Yingchao Li, Jiangsu (CN); Dali Li, Jiangsu (CN)

(73) Assignee: INSPUR SU ZHOU INTELLIGENT TECHNOLOGY CO., LTD., Jiangsu (CN)

(*) Notice: Subject to any disclaimer, the term of this patent is extended or adjusted under 35 U.S.C. 154(b) by 130 days.

(21) Appl. No.: 17/613,371

(22) PCT Filed: Jul. 31, 2019

(86) PCT No.: PCT/CN2019/098519
§ 371 (c)(1),
(2) Date: Nov. 22, 2021

(87) PCT Pub. No.: WO2020/232831
PCT Pub. Date: Nov. 26, 2020

(65) Prior Publication Data
US 2022/0224226 A1 Jul. 14, 2022

(30) Foreign Application Priority Data
May 22, 2019 (CN) .......................... 201910427600.9

(51) Int. Cl.
*H02M 3/06* (2006.01)
*H02M 1/00* (2006.01)
(Continued)

(52) U.S. Cl.
CPC .............. *H02M 3/06* (2013.01); *G05D 23/24* (2013.01); *H02M 1/0019* (2021.05); *H02M 3/158* (2013.01)

(58) Field of Classification Search
CPC ...... H02M 3/06; H02M 1/0019; H02M 3/158; H02M 1/14; H02M 3/156; H02M 3/1566; H02M 1/0003; G05D 23/24
See application file for complete search history.

(56) References Cited

U.S. PATENT DOCUMENTS

2007/0241727 A1* 10/2007 Luo ...................... H02M 3/1588
323/272
2009/0174383 A1* 7/2009 Tsui ...................... H02M 3/156
323/282
(Continued)

FOREIGN PATENT DOCUMENTS

CN 201479001 * 5/2010 ............. H02M 3/00
CN 201479001 U 5/2010
(Continued)

OTHER PUBLICATIONS

Attached foreign patent CN201479001 translated with Espacenet. (Year: 2010).*
(Continued)

*Primary Examiner* — Shawki S Ismail
*Assistant Examiner* — Htet Z Kyaw
(74) *Attorney, Agent, or Firm* — DINSMORE & SHOHL LLP

(57) ABSTRACT

Disclosed are a voltage compensation method and device of a voltage reducing circuit. The voltage compensation method includes: determining a capacitance value of each capacitor and a resistance value of each resistor in a voltage compensation circuit according to a voltage compensation expectation of the voltage reducing circuit; determining each zero and each pole of a transfer function of the voltage compensation circuit according to the capacitance value of each capacitor and the resistance value of each resistor; setting each capacitor and the resistor not in direct connection with the capacitor in series to have a positive tempera- (Continued)

ture coefficient, and setting the resistor in direct connection with the capacitor in series to have a negative temperature coefficient; and compensating voltage for the voltage reducing circuit by using the voltage compensation circuit to output a rated voltage.

8 Claims, 2 Drawing Sheets

(51) Int. Cl.
*G05D 23/24* (2006.01)
*H02M 3/158* (2006.01)

(56) References Cited

U.S. PATENT DOCUMENTS

2018/0219484 A1* 8/2018 Mercer .................. H02M 3/158
2019/0028027 A1* 1/2019 Cho ........................ H02M 1/44

FOREIGN PATENT DOCUMENTS

| CN | 103297089 | A | | 9/2013 | |
| CN | 104897150 | A | | 9/2015 | |
| CN | 105429611 | | * | 3/2016 | ............... H03K 3/02 |
| CN | 105429611 | A | | 3/2016 | |
| CN | 205920425 | U | | 2/2017 | |

OTHER PUBLICATIONS

Attached foreign patent CN105429611 translated with Espacenet. (Year: 2016).*
International Search Report dated Feb. 26, 2020; International Application No. PCT/CN2019/098519.
Written Opinion of the International Searching Authority dated Feb. 26, 2020, International application No. PCT/CN2019/098519.
Abstract for journal article—Area and Power-Efficient Monolithic Buck Converters With Pseudo-Type III Compensation, published in IEEE Jounal of Solid-State Circuits vol. 45 No. 8 on Aug. 31, 2010.
Journal Article for A fully integrated design of improved Pseudo type-III compensation for DC-DC converters; dated Feb. 5, 2012; China Academic Journal Electronic Publishing House; 1994-2019; http://www.cnki.net.

* cited by examiner

VOLTAGE COMPENSATION METHOD AND DEVICE OF VOLTAGE REDUCING CIRCUIT

CROSS REFERENCE TO RELATED APPLICATIONS

This application is the U.S. National Stage of PCT/CN2019/098519 filed Jul. 31, 2019, which claims priority to Chinese Patent Application No. 201910427600.9 filed on May 22, 2019, the entire contents of which are incorporated herein by reference.

TECHNICAL FIELD

The present disclosure relates to the field of electronic circuits, and more particularly, relates to a voltage compensation method and device of a voltage reducing circuit.

BACKGROUND

Voltage reducing circuits in a voltage control mode are widely used in the design of server power board cards. In order to reduce ripples of an output voltage of a voltage reducing circuit and to achieve rapid dynamic response when a load changes to ensure the stability of the output voltage, the voltage reducing circuit mostly uses a ceramic capacitor with smaller equivalent series resistance, lower model and cost as an output capacitor. The use of the ceramic capacitor significantly affects the effect of an error amplifier in a feedback circuit of the voltage reducing circuit and also changes the stability of the voltage reducing circuit. Thus, in order to guarantee the stability of the voltage reducing circuit, a compensation circuit is introduced in the prior art.

In the prior art, appropriate resistors and capacitors are selected, and the pole and zero of the compensation circuit are controlled within a certain range to change the pole and zero of a transfer function of the voltage reducing circuit, so as to maintain the stability of the voltage reducing circuit, thereby enabling the voltage reducing circuit to have smaller output ripples and faster dynamic response, and improving the noise immunity of the circuit. However, resistance and capacitance values of the compensation circuit are no longer changed after the design is completed, and for adaptation of all working environments and consideration that the capacitance value the ceramic capacitor decreases with temperature, the capacitance value can only be over designed empirically, so that the compensation circuit cannot reach the desired requirements, or even is absent from the effect of stabilizing the circuit. In addition, the design cost is increased as the over-design on the capacitance value increases the number of capacitors.

There is currently no effective solution to the problems of high cost, poor temperature adaptation, low compensation accuracy, and poor stability of the compensation circuit in the prior art.

SUMMARY

In view of this, the objectives of embodiments of the present disclosure are to provide a voltage compensation method and device of a voltage reducing circuit, which can provide a stable voltage compensation effect in accordance with expectations for different voltage reducing circuits at different temperatures, reduce hardware cost, improve temperature adaptability, compensation accuracy, and stability of an output voltage.

Based on the above objectives, in an aspect of an embodiments of the present disclosure, a voltage compensation circuit of a voltage reducing circuit is provided and includes the following steps:

determining a capacitance value of each capacitor and a resistance value of each resistor in a voltage compensation circuit according to a voltage compensation expectation of the voltage reducing circuit;

determining each zero and each pole of a transfer function of the voltage compensation circuit according to the capacitance value of each capacitor and the resistance value of each resistor;

setting each capacitor and the resistor not in direct connection with the capacitor in series to have a positive temperature coefficient, and setting the resistor in direct connection with the capacitor in series to have a negative temperature coefficient, wherein the positive and negative temperature coefficients are set to enable a variable quantity, generated when a temperature change occurs, of each zero and each pole of the transfer function of the voltage compensation circuit to not exceed a predetermined fluctuation range; and compensating voltage for the voltage reducing circuit by using the voltage compensation circuit to output a rated voltage.

In some embodiments, the voltage reducing circuit is a BUCK circuit.

In some embodiments, the voltage compensation circuit is a type-3 compensation circuit.

In some embodiments, the voltage compensation circuit includes resistors Rc1, Rf1, Rf2, Rf3 and capacitors Cc1, Cc2, Cf3, wherein the resistor Rf3 and the capacitor Cf3 are connected in series and then are connected in parallel with the resistor Rf1 between an output voltage and an inverting input terminal of a comparator; the resistor Rc1 and the capacitor Cc1 are connected in series and then are connected in parallel with the capacitor Cc2 between the inverting input terminal and an inverting output terminal of the comparator; and the inverting input terminal of the comparator is grounded through the resistor Rf2.

In some embodiments, the transfer function of the voltage compensation circuit has two zeros and three poles.

In some embodiments, the capacitors Cc1, Cc2, Cf3 are capacitors having a positive temperature coefficient; the resistors Rf1, Rf2 are resistors having a positive temperature coefficient; and the resistors Rc1, Rf3 are resistors having a negative temperature coefficient.

In some embodiments, the transfer function of the voltage compensation circuit has two zeros and three poles.

In some embodiments, the two zeros FZ1, FZ2 are respectively:

$$F_{Z1} = \frac{1}{2\pi \cdot R_{C1} \cdot C_{C1}}$$

$$F_{Z2} = \frac{1}{2\pi \cdot C_{f3} \cdot (R_{f1} + R_{f3})}.$$

In some embodiments, the three poles FP1, FP2, FP3 are respectively:

$$F_{p1} = 0$$
$$F_{p2} = \frac{1}{2\pi \cdot C_{f3} \cdot R_{f3}}$$
$$F_{p3} = \frac{1}{2\pi \cdot R_{C1} \cdot C_{C2}}.$$

In another aspect of an embodiment of the present disclosure, a voltage compensation device of a voltage reducing circuit is provided and includes:

a voltage compensation circuit, connected to a BUCK circuit and including a plurality of capacitors and a plurality of resistors, wherein the capacitors and the resistors not directly connected in series with the capacitors have a positive temperature coefficient, the resistors directly connected in series with the capacitors have a negative temperature coefficient, and the positive and negative temperature coefficients are set such that a variable quantity, generated when a temperature change occurs, of each zero and each pole of a transfer function of the voltage compensation circuit does not exceed a predetermined fluctuation range.

In a further aspect of an embodiment of the present disclosure, a voltage reducing circuit is provided and includes the above voltage compensation device of the voltage reducing circuit.

The present disclosure has the following beneficial effects: according to the voltage compensation method and device of the voltage reducing circuit provided by the embodiments of the present disclosure, the stable voltage compensation effect in accordance with expectations can be provided for different voltage reducing circuits at different temperatures, the hardware cost can be reduced, and the temperature adaptability, compensation accuracy, and stability of the output voltage can be improved by the technical solution that the capacitance value of each capacitor and the resistance value of each resistor in the voltage compensation circuit are determined according to the voltage compensation expectation of the voltage reducing circuit, each zero and each pole of the transfer function of the voltage compensation circuit are determined according to the capacitance value of each capacitor and the resistance value of each resistor, each capacitor and the resistor not in direct connection with the capacitor in series are set to have the positive temperature coefficient, the resistor in direct connection with the capacitor in series is set to have the negative temperature coefficient, and the voltage is compensated for the voltage reducing circuit by using the voltage compensation circuit to output the rated voltage.

BRIEF DESCRIPTION OF THE DRAWINGS

In order to illustrate the embodiments of the present disclosure or the technical solutions more clearly in the prior art, the accompanying drawings required to be used in the description of the embodiments or the prior art will be briefly described below. Obviously, the accompanying drawings in the following description are only some embodiments of the present disclosure, and those of ordinary skill in the art may also obtain other embodiments according to these accompanying drawings without creative work.

DETAILED DESCRIPTION

In order that the objectives, technical solutions, and advantages of the present disclosure become more apparent, embodiments of the present disclosure will be described in further detail below in connection with specific embodiments and with reference to the accompanying drawings.

It should be noted that expressions "first" and "second" in the embodiments of the disclosure are used to distinguish two different entities or parameters with the same name, and it can be seen that "first" and "second" are used merely for convenience of presentation and are not to be understood as a limitation on the embodiments of the present disclosure. The same illustration will not be described for the subsequent embodiments separately.

Figure 1:
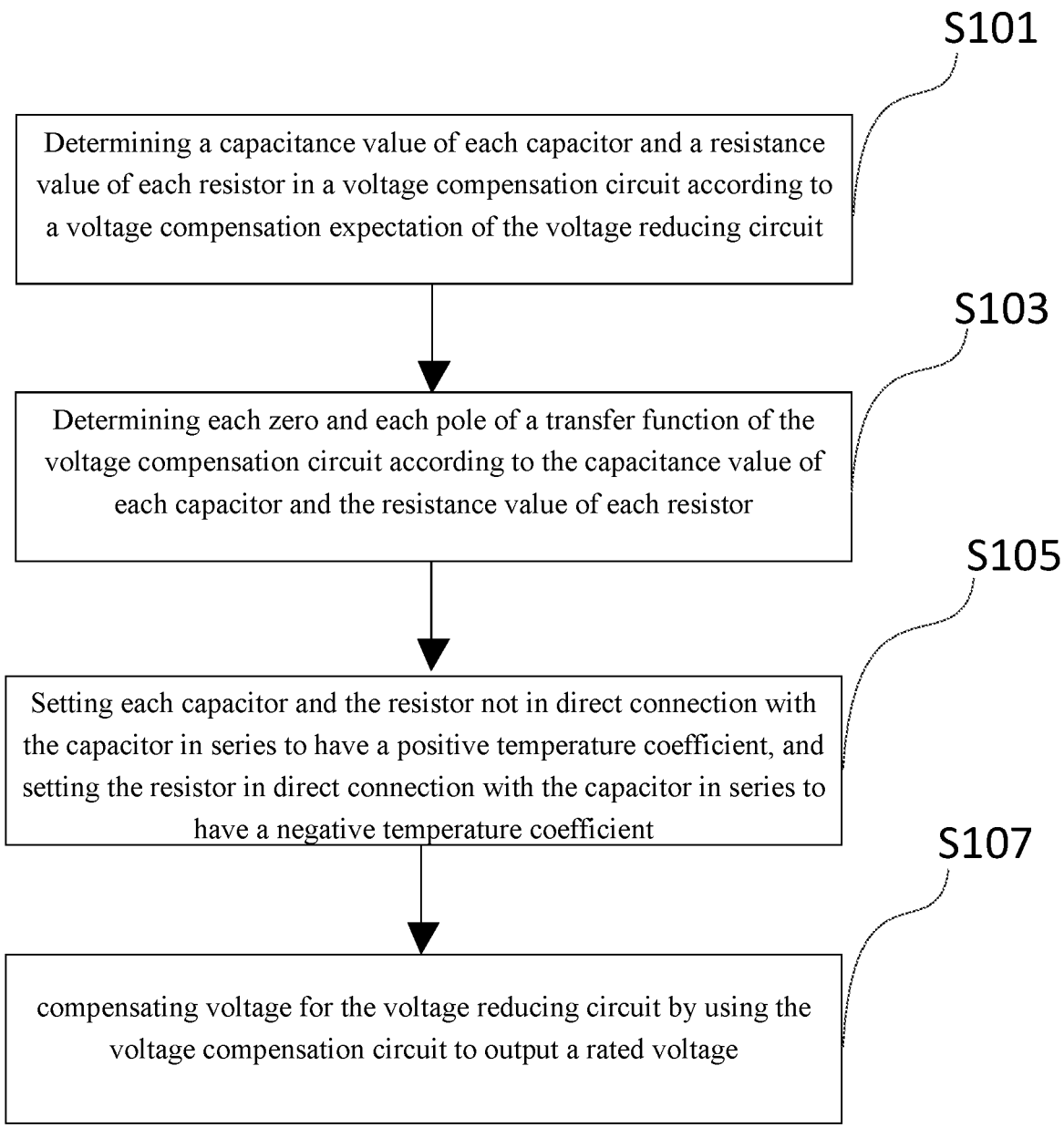
FIG. 1 is a flow chart of a voltage compensation method of a voltage reducing circuit provided by the present disclosure.

Based on the above objectives, a first aspect of an embodiment of the present disclosure provides an embodiment of a method capable of providing a stable voltage compensation effect in accordance with expectations for different voltage reducing circuits at different temperatures. FIG. 1 shows a flow chart of an embodiment of a voltage compensation method of a voltage reducing circuit provided by the present disclosure.

The voltage compensation method of the voltage reducing circuit includes the following steps:

step S101, determining a capacitance value of each capacitor and a resistance value of each resistor in a voltage compensation circuit according to a voltage compensation expectation of the voltage reducing circuit;

step S103, determining each zero and each pole of a transfer function of the voltage compensation circuit according to the capacitance value of each capacitor and the resistance value of each resistor;

step S105, setting each capacitor and the resistor not in direct connection with the capacitor in series to have a positive temperature coefficient, and setting the resistor in direct connection with the capacitor in series to have a negative temperature coefficient, wherein the positive and negative temperature coefficients are set to enable a variable quantity, generated when a temperature change occurs, of each zero and each pole of the transfer function of the voltage compensation circuit to not exceed a predetermined fluctuation range; and step S107, compensating voltage for the voltage reducing circuit by using the voltage compensation circuit to output a rated voltage.

In the embodiment of the present disclosure, for the phenomenon that the capacitance value decreases with temperature, according to a zero-pole calculation formula of the transfer function of the compensation circuit, resistance values of thermistors having a negative temperature coefficient increase when the capacitance values of the capacitors having a positive temperature coefficient decrease with temperature, so that each zero and pole of the transfer function of the compensation circuit are stabilized within a design range to achieve a compensation effect.

Those of ordinary skill in the art can understand that all or part of flows of the method in the above embodiment can be implemented by instructing related hardware through a computer program which is stored in a computer readable storage medium. When executed, the program may include flows of the above method embodiments. The storage medium may be a magnetic disk, an optical disk, a read only memory (ROM), a random access memory (RAM), etc. The embodiment of the computer program can achieve the effects the same as or similar to the effects of the above any corresponding method embodiment.

In some embodiments, the voltage reducing circuit is a BUCK circuit.

In some embodiments, the voltage compensation circuit is a type-3 compensation circuit.

In the prior art, the Buck circuit in a voltage control mode is widely used in the design of server power board cards. In order to reduce ripples of an output voltage of the Buck circuit and to guarantee faster dynamic response when a load changes to ensure the stability of the output voltage, the Buck circuit mostly uses a ceramic capacitor with smaller equivalent series resistance, lower model and cost as an output capacitor. The use of the ceramic capacitor significantly affects the effect of an error amplifier in a feedback circuit of the Buck circuit and changes the stability of the Buck circuit. Thus, in order to guarantee the stability of the Buck circuit, the voltage compensation circuit is introduced. In the step S101 in the method, the appropriate resistors and capacitors are selected to control each zero and pole of the compensation circuit to be within a certain range, thereby changing the zero and pole of the transfer function of the Buck circuit. In this way, the stability of the Buck circuit can be maintained according to the step S107, so that the Buck circuit has smaller output ripples and faster dynamic response, and the noise immunity of the circuit is improved.

However, the resistance and capacitance values of the compensation circuit are no longer changed after the design is completed, and for adaptation of all working environments and consideration that the capacitance value of the ceramic capacitor decreases with temperature, the capacitance values can only be over designed empirically, so that the compensation circuit cannot achieve the desired requirements, or even is absent from the effect of stabilizing the circuit. In addition, the design cost is increased as the over-design on the capacitance value increases the number of capacitors. In the embodiment of the present disclosure, for the phenomenon that the capacitance value of the capacitor decreases with temperature, according to the zero-pole calculation formula of the transfer function of the compensation circuit, the thermistors having the negative temperature coefficient replace Rc1 and Rf3. Therefore, when capacitance values of capacitors Cc1, Cc2, Cf3 decrease as temperature changes, resistance values of the thermistors Rc1, Rf3 increase as temperature changes, so that the zero and pole of the transfer function of the compensation circuit are stabilized within the design range to achieve an ideal compensation effect.

The method disclosed by the embodiment of the present disclosure may also be implemented as a computer program executed by a CPU, and the computer program may be stored in a computer readable storage medium. When the computer program is executed by the CPU, the above functions defined in the method disclosed by the embodiment of the present disclosure are executed. The steps of the above method may also be implemented by utilizing a controller and a computer readable storage medium for storing the computer program enabling the controller to implement the above steps.

Figure 2:
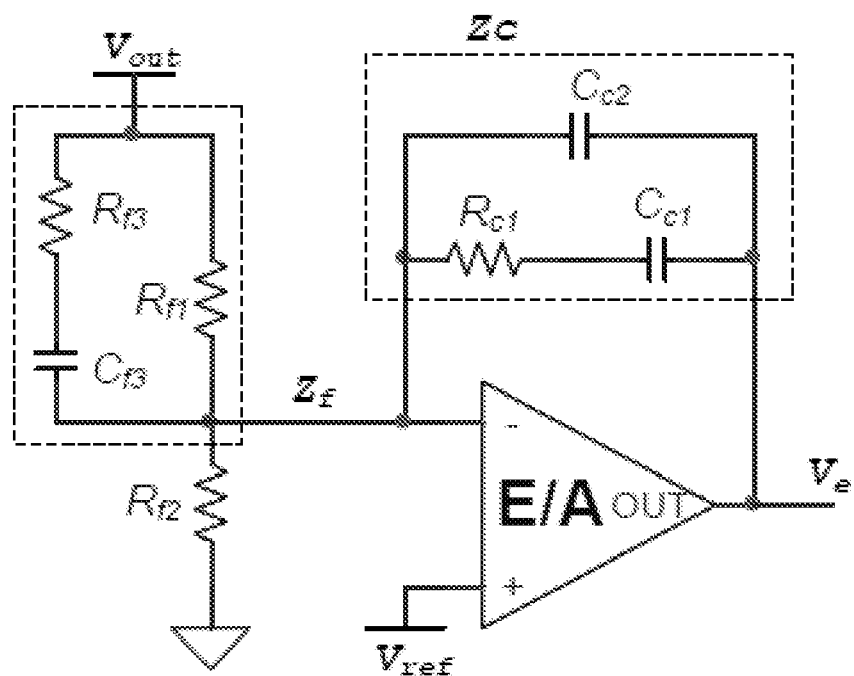
FIG. 2 is a principle diagram of a type-3 compensation circuit of a voltage compensation method of a voltage reducing circuit provided by the present disclosure.

The settings of the resistors having the positive temperature coefficient and the negative temperature coefficient involved in step S105 refer to FIG. 2. As shown in FIG. 2, the voltage compensation circuit includes resistors Rc1, Rf1, Rf2, Rf3 and capacitors Cc1, Cc2, Cf3, wherein the resistor Rf3 and the capacitor Cf3 are connected in series and then are connected in parallel with the resistor Rf1 between an output voltage and an inverting input terminal of a comparator; the resistor Rd and the capacitor Cc1 are connected in series and then are connected in parallel with the capacitor Cc2 between the inverting input terminal and an inverting output terminal of the comparator; and the inverting input terminal of the comparator is grounded through the resistor Rf2.

In some embodiments, the capacitors Cc1, Cc2, Cf3 are capacitors having a positive temperature coefficient; the resistors Rf1, Rf2 are resistors having a positive temperature coefficient; and the resistors Rc1, Rf3 are resistors having a negative temperature coefficient. According to the embodiment of the present disclosure, according to the zero-pole calculation formula of the transfer function of the compensation circuit, thermistors having the negative temperature coefficient replace Rc1 and Rf3. Therefore, when capacitance values of the capacitors Cc1, Cc2, Cf3 decrease as temperature changes, resistance values of the thermistors Rc1, Rf3 increase as temperature changes, so that the zero and pole of the transfer function of the compensation circuit are stabilized within the design range to achieve an ideal compensation effect.

In some embodiments, the transfer function of the voltage compensation circuit has two zeros and three poles.

In some embodiments, by the definition of the step S103, the two zeros FZ1, FZ2 are respectively determined as:

$$F_{Z1} = \frac{1}{2\pi \cdot R_{C1} \cdot C_{C1}}$$

$$F_{Z2} = \frac{1}{2\pi \cdot C_{f3} \cdot (R_{f1} + R_{f3})}.$$

In some embodiments, by the definition of the step S103, the three poles FP1, FP2, FP3 are respectively determined as:

$$F_{p1} = 0$$

$$F_{p2} = \frac{1}{2\pi \cdot C_{f3} \cdot R_{f3}}$$

$$F_{p3} = \frac{1}{2\pi \cdot R_{C1} \cdot C_{C2}}.$$

The above two zeros and three poles are obtained by calculating zeros and zeros of a first-order derivative through a transfer function below:

$$H(s) \approx \frac{(1 + R_{C1} \cdot C_{C1} \cdot s) \cdot [1 + s \cdot C_{f3} \cdot (R_{f1} + R_{f3})]}{s \cdot R_{f1} \cdot C_{C1} \cdot (R_{C1} \cdot C_{C2} \cdot s + 1) \cdot (1 + s \cdot R_{f3} \cdot C_{f3})}.$$

The above formula is obtained by substituting voltage values and resistance values into a transfer function $$H(s) = \frac{V_e}{V_{out}} = -\frac{Z_C}{Z_f}.$$

The appropriate resistors Rc1, Rf1, Rf2, Rf3 and capacitors Cc1, Cc2, Cf3 are selected to control the zero and pole of the compensation circuit to be within a certain range.

Those skilled in the art will further understand that various exemplary steps described in conjunction with the disclosure herein can be implemented as electronic hardware, computer software or a combination thereof. In order to illustrate the interchangeability of the hardware and software, the interchangeability is generally described in terms of the functions of the various exemplary steps. Whether the functions are implemented as software or hardware depends on specific application and design constraints imposed on a whole system. The implementation of the functions can be performed by those skilled in the art in various manners for each specific application, but such implementation decision should not be interpreted as causing a departure from the scope disclosed by the embodiments of the present disclosure.

It can be seen from the above embodiments that according to the voltage compensation method of the voltage reducing circuit provided by the embodiments of the present disclosure, the stable voltage compensation effect in accordance with expectations can be provided for different voltage reducing circuits at different temperatures, the hardware cost can be reduced, and the temperature adaptability, compensation accuracy, and stability of the output voltage can be improved by the technical solution that the capacitance value of each capacitor and the resistance value of each resistor in the voltage compensation circuit are determined according to the voltage compensation expectation of the voltage reducing circuit, each zero and each pole of the transfer function of the voltage compensation circuit are determined according to the capacitance value of each capacitor and the resistance value of each resistor, each capacitor and the resistor not in direct connection with the capacitor in series are set to have the positive temperature coefficient, the resistor in direct connection with the capacitor in series is set to have the negative temperature coefficient, and the voltage is compensated for the voltage reducing circuit by using the voltage compensation circuit to output the rated voltage.

It should be particularly noted that the steps in the various embodiments of the above voltage compensation method of the voltage reducing circuit can be mutually overlap, be replaced, added, and deleted, so that the transformations of these reasonable permutations and combinations should also fall within the protective scope of the present disclosure for the voltage compensation method of the voltage reducing circuit, and the protective scope of the present disclosure should not be limited to the above embodiments.

Based on the above objectives, a second aspect of an embodiment of the present disclosure provides an embodiment of a device capable of providing a stable voltage compensation effect in accordance with expectations for different voltage reducing circuits at different temperatures. The device includes:

a voltage compensation circuit, connected to a BUCK circuit and including a plurality of capacitors and a plurality of resistors, wherein the capacitors and the resistors not directly connected in series with the capacitors have a positive temperature coefficient, the resistors directly connected in series with the capacitors have a negative temperature coefficient, and the positive and negative temperature coefficients are set such that a variable quantity, generated when a temperature change occurs, of each zero and each pole of a transfer function of the voltage compensation circuit does not exceed a predetermined fluctuation range.

In an embodiment, the plurality of resistors include resistors Rc1, Rf1, Rf2, Rf3, and the plurality of capacitors include capacitors Cc1, Cc2, Cf3, wherein the resistor Rf3 and the capacitor Cf3 are connected in series and then are connected in parallel with the resistor Rf1 between an output voltage and an inverting input terminal of a comparator; the resistor Rc1 and the capacitor Cc1 are connected in series and then are connected in parallel with the capacitor Cc2 between the inverting input terminal and an inverting output terminal of the comparator; and the inverting input terminal of the comparator is grounded through the resistor Rf2.

The device, apparatus or the like disclosed by the embodiment of the present disclosure may be various electronic terminal devices such as a cell phone, a personal digital assistants (PDA), a PAD and a smart television, and may also be a large terminal device such as a server, so that the protective scope of the embodiment of the present disclosure should not be limited to a certain specific type of device or apparatus. A client disclosed by the embodiment of the present disclosure may be applied to the above any one of the electronic terminal devices in manners of electronic hardware, computer software or a combination thereof.

Based on the above objectives, a third aspect of an embodiment of the present disclosure provides an embodiment of a voltage reducing circuit capable of providing stable output voltage at different temperatures. The voltage reducing circuit includes the above voltage compensation device of the voltage reducing circuit.

It can be seen from the above embodiments that according to the voltage compensation method of the voltage reducing circuit, and the voltage reducing circuit provided by the embodiments of the present disclosure, the stable voltage compensation effect in accordance with expectations can be provided for different voltage reducing circuits at different temperatures, the hardware cost can be reduced, and the temperature adaptability, compensation accuracy, and stability of the output voltage can be improved by the technical solution that the capacitance value of each capacitor and the resistance value of each resistor in the voltage compensation circuit are determined according to the voltage compensation expectation of the voltage reducing circuit, each zero and each pole of the transfer function of the voltage compensation circuit are determined according to the capacitance value of each capacitor and the resistance value of each resistor, each capacitor and the resistor not in direct connection with the capacitor in series are set to have the positive temperature coefficient, the resistor in direct connection with the capacitor in series is set to have the negative temperature coefficient, and the voltage is compensated for the voltage reducing circuit by using the voltage compensation circuit to output the rated voltage.

It should be particularly noted that in the above embodiments of the voltage compensation device of the voltage reducing circuit and the voltage reducing circuit, the work processes of various modules are specifically illustrated by adopting the embodiments of the voltage compensation method of the voltage reducing circuit, and those skilled in the art can easily conceive that these modules are applied to other embodiments of the voltage compensation method of the voltage reducing circuit. Of course, the steps in the embodiments of the voltage compensation method of the voltage reducing circuit can be mutually overlap, be replaced, added, and deleted, so that the transformations of these reasonable permutations and combinations should also fall within the protective scope of the present disclosure for the voltage compensation method of the voltage reducing circuit, and the protective scope of the present disclosure should not be limited to the above embodiments.

The above are the exemplary embodiments disclosed by the present disclosure, but it should be noted that multiple changes and modifications can be made without departing from the scope disclosed by the embodiments of the present disclosure and defined by the claims. The functions, steps and/or actions of the method claims of the disclosed embodiments described herein do not need to be executed in any specific order. In addition, although the elements disclosed in the embodiments of the present disclosure may be described or required in a singular form, and may also be understood a plural form unless explicitly limited to the singular number.

It should be understood that as used herein, unless the context clearly supports exceptions, the singular form "a/an" is intended to also include the plural form. It should also be understood that as used herein, "and/or" means to include any and all possible combinations of one or more associated items listed. The serial numbers of the disclosed embodiments of the present disclosure are only for description, and do not represent the superiority or inferiority of the embodiments.

Those of ordinary skill in the art should understand that the discussion of any of the above embodiments is only exemplary, and is not intended to imply that the scope (including the claims) disclosed by the embodiments of the present disclosure is limited to these examples; combinations of the technical features in the above embodiments or in different embodiments are also possible under the idea of the embodiments of the present disclosure, and there are many other changes in different aspects of the embodiments of the present disclosure as described above, which are not provided in detail in the interest of conciseness. Therefore, any omissions, modifications, equivalent substitutions, improvements, or the like made within the spirit and principle of the embodiments of the present disclosure should be included in the protective scope of the embodiments of the present disclosure.

What is claimed is:

1. A voltage compensation method of a voltage reducing circuit, comprising the following steps:
    determining a capacitance value of each capacitor and a resistance value of each resistor in a voltage compensation circuit according to a voltage compensation expectation of the voltage reducing circuit;
    determining each zero and each pole of a transfer function of the voltage compensation circuit according to the capacitance value of each capacitor and the resistance value of each resistor;
    setting each capacitor and the resistor not in direct connection with the capacitor in series to have a positive temperature coefficient, and setting the resistor in direct connection with the capacitor in series to have a negative temperature coefficient, wherein the positive and negative temperature coefficients are set to enable a variable quantity, generated when a temperature change occurs, of each zero and each pole of the transfer function of the voltage compensation circuit to not exceed a predetermined fluctuation range; and
    compensating voltage for the voltage reducing circuit by using the voltage compensation circuit to output a rated voltage;
    wherein the voltage compensation circuit comprises resistors (Rc1), (Rf1), (Rf2), (Rf3) and capacitors (Cc1), (Cc2), (Cf3), wherein the resistor Rf3 and the capacitor Cf3 are connected in series and then are connected in parallel with the resistor Rf1 between an output voltage and an inverting input terminal of a comparator; the resistor Rc1 and the capacitor Cc1 are connected in series and then are connected in parallel with the capacitor Cc2 between the inverting input terminal and an inverting output terminal of the comparator; and the inverting input terminal of the comparator is grounded through the resistor Rf2;
    wherein the capacitors Cc1, Cc2, Cf3 are capacitors having a positive temperature coefficient; the resistors Rf1, Rf2 are resistors having a positive temperature coefficient; and the resistors Rc1, Rf3 are resistors having a negative temperature coefficient;
    according to a zero-pole calculation formula of the transfer function of the compensation circuit, resistance values of themistors having a negative temperature coefficient increase when the capacitance values of the capacitors having a positive temperature coefficient decrease with temperature, so that each zero and pole of the transfer function of the compensation circuit are stabilized within a certain range.

2. The method according to claim 1, wherein the voltage reducing circuit is a BUCK circuit.

3. The method according to claim 1, wherein the voltage compensation circuit is a type-3 compensation circuit.

4. The method according to claim 1, wherein the transfer function of the voltage compensation circuit has two zeros and three poles.

5. The method according to claim 4, wherein the two zeros (FZ1), (FZ2) are respectively:

$$F_{Z1} = \frac{1}{2\pi \cdot R_{C1} \cdot C_{C1}}$$

$$F_{Z2} = \frac{1}{2\pi \cdot C_{f3} \cdot (R_{f1} + R_{f3})}.$$

6. The method according to claim 4, wherein the three poles (FP1), (FP2), (FP3) are respectively:

$$F_{p1} = 0$$

$$F_{p2} = \frac{1}{2\pi \cdot C_{f3} \cdot R_{f3}}$$

$$F_{p3} = \frac{1}{2\pi \cdot R_{C1} \cdot C_{C2}}.$$

7. A voltage compensation device of a voltage reducing circuit, comprising:
    a voltage compensation circuit, connected with a BUCK circuit and comprising a plurality of capacitors and a plurality of resistors, wherein the capacitors and the resistors not directly connected in series with the capacitors have a positive temperature coefficient, and the resistors directly connected in series with the capacitors have a negative temperature coefficient, and the positive and negative temperature coefficients are set such that a variable quantity, generated when a temperature change occurs, of each zero and each pole of a transfer function of the voltage compensation circuit does not exceed a predetermined fluctuation range;
    wherein the voltage compensation circuit comprises resistors (Rc1), (Rf1), (Rf2), (Rf3) and capacitors (Cc1), (Cc2), (Cf3), wherein the resistor Rf3 and the capacitor Cf3 are connected in series and then are connected in parallel with the resistor Rf1 between an output voltage and an inverting input terminal of a comparator; the resistor Rc1 and the capacitor Cc1 are connected in series and then are connected in parallel with the capacitor Cc2 between the inverting input terminal and an inverting output terminal of the comparator; and the inverting input terminal of the comparator is grounded through the resistor Rf2;

wherein the capacitors Cc1, Cc2, Cf3 are capacitors having a positive temperature coefficient; the resistors Rf1, Rf2 are resistors having a positive temperature coefficient; and the resistors Rc1, Rf3 are resistors having a negative temperature coefficient;

according to a zero-pole calculation formula of the transfer function of the compensation circuit, resistance values of themistors having a negative temperature coefficient increase when the capacitance values of the capacitors having a positive temperature coefficient decrease with temperature, so that each zero and pole of the transfer function of the compensation circuit are stabilized within a certain range.

8. The voltage reducing circuit, comprising the voltage compensation device of the voltage reducing circuit according to claim 7.

\* \* \* \* \*